United States Patent [19]

Wagner

[11] Patent Number: 4,730,220
[45] Date of Patent: Mar. 8, 1988

[54] DEVICE FOR ELECTRONIC RECORDING OF IMAGES WITH AN OPTICAL RADIATION-EMITTING SYSTEM AND A DETECTOR SYSTEM FOR DETECTING THE RECEIVED IMAGE INFORMATION

[75] Inventor: Elmar Wagner, Heilbronn, Fed. Rep. of Germany

[73] Assignee: Telefunken Electronic GmbH, Heilbronn, Fed. Rep. of Germany

[21] Appl. No.: 873,793

[22] Filed: Jun. 11, 1986

[30] Foreign Application Priority Data

Jun. 13, 1985 [DE] Fed. Rep. of Germany ....... 3521157

[51] Int. Cl.$^4$ .............................................. H04N 1/04
[52] U.S. Cl. .................................. 358/280; 358/285; 358/293; 358/296
[58] Field of Search ............... 358/294, 293, 285, 300, 358/296, 69; 250/578, 563; 315/169.3, 169.4

[56] References Cited

U.S. PATENT DOCUMENTS 4,639,608  1/1987  Kuroda ............................... 358/293

FOREIGN PATENT DOCUMENTS 1221270  7/1966  Fed. Rep. of Germany .
3239492  5/1984  Fed. Rep. of Germany .
3339256  5/1984  Fed. Rep. of Germany .

Primary Examiner—Edward L. Coles, Sr.
Attorney, Agent, or Firm—Spencer & Frank

[57] ABSTRACT

In a device for electronic recording of images with an optical, radiation-emitting exposure device and a detector system for detecting the image information received, a sequentially triggered system of radiation-emitting elements is provided for exposure, and the image to be recorded is optically scanned by the sequentially triggered radiation-emitting elements.

5 Claims, 9 Drawing Figures

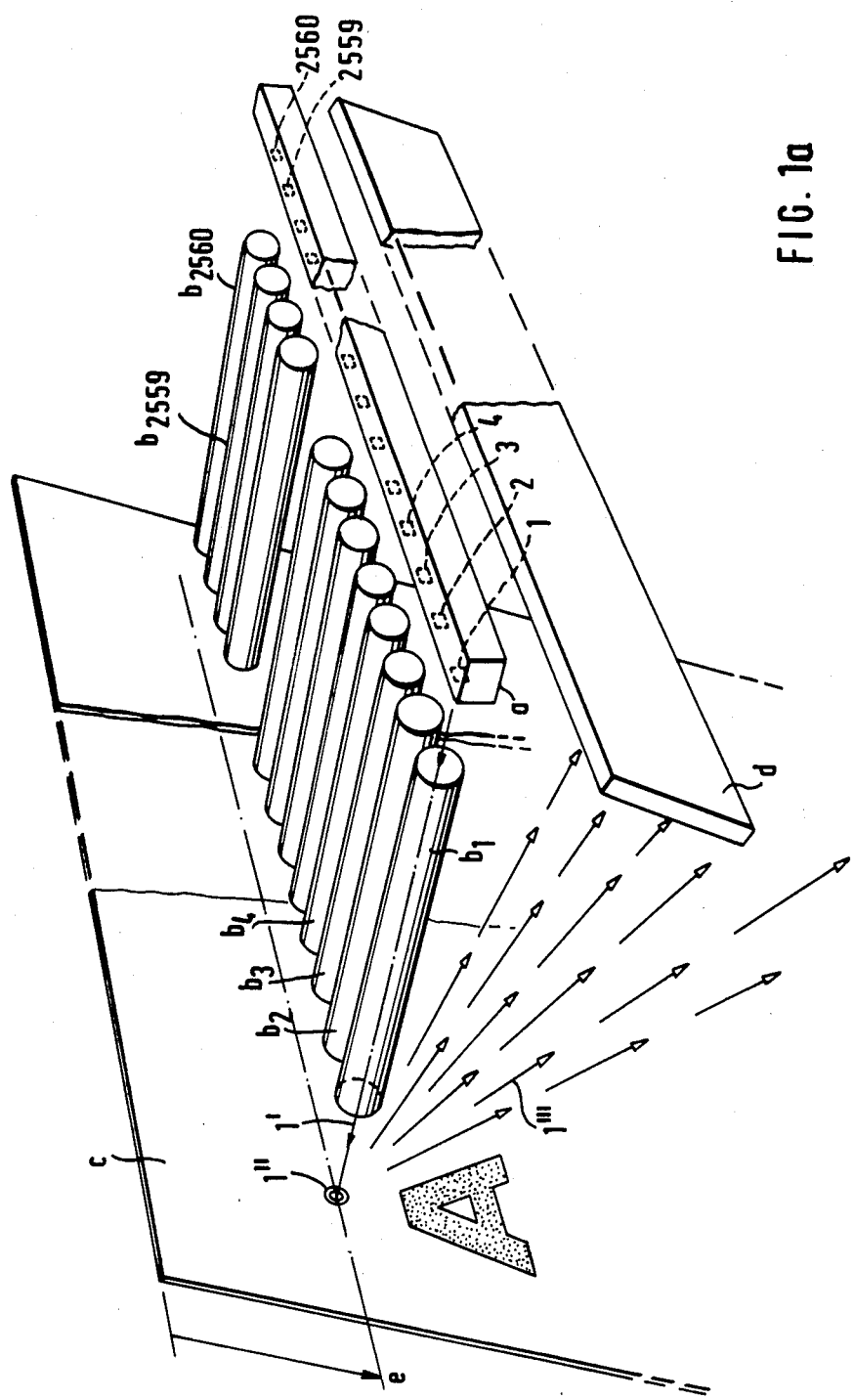

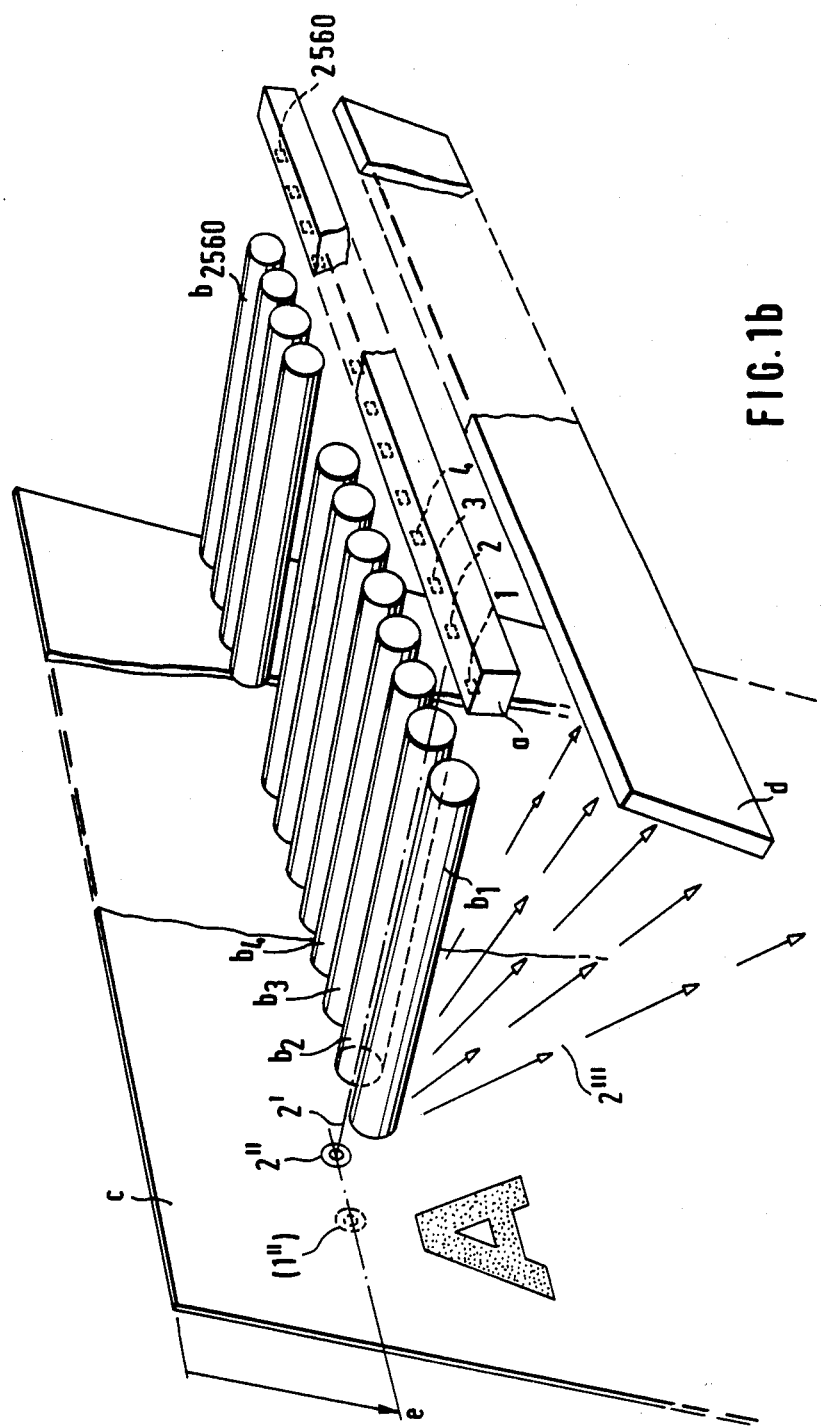

DEVICE FOR ELECTRONIC RECORDING OF IMAGES WITH AN OPTICAL RADIATION-EMITTING SYSTEM AND A DETECTOR SYSTEM FOR DETECTING THE RECEIVED IMAGE INFORMATION

BACKGROUND OF THE INVENTION

The invention relates to a device for electronic recording of images with an optical, radiation-emitting system and a detector system for detecting the received image information.

In mordern data technology, images and documents such as written or graphic material are recorded electronically and reproduced on a display or printer. The data received can be reproduced directly or placed in interim storage. The data can be transmitted via data lines, which can span large distances. The data are output by printer units, which work, for example, according to the electro-photographic principle using high-resolution LED arrays. To record the data, the image or document in question is first illuminated. Illumination of the images results in a reflected signal which is picked up by an optical scanner. A detector array, for example, may be used as an optical scanner, said array comprising, for example, detector diodes. The document recording method described involves digitalization of documents in the form of a 1-bit resolution (black/white) or with higher resolution for grey scale recording.

In known methods of electro-optical scanning, the section of the image to be recorded is subjected to uniform and constant illumination. Electronic recording is effected by projecting the image section onto a detector array of sufficiently high resolution which converts the beams reflected off the document into electrical signals. The known electro-optical scanning method has the drawback that a relatively large section of the image has to be illuminated uniformly and constantly to prevent a falsification of the signal due to differing illumination. A further drawback of known electro-optical scanning is that the beams reflected from many points of the image section can generate background interference in the signal.

SUMMARY OF THE INVENTION

It is an object of the invention to provide a device for electronic recording of images not having the above drawbacks and so not requiring constant and uniform illumination of a relatively large section of an image.

According to the invention, a device for electronic recording of images radiation has as its illumination device a sequentially triggered system of radiation-emitting elements, and the image to be recorded is partially optically scanned using the sequentially triggered radiation-emitting elements.

A linear array of radiation-emitting elements, for example, is used as the radiation-emitting element system, said array being triggered by an electronic circuit. A system of this type is already on the market as an exposure module for electro-photographic printers, so that the invention is feasible with relatively simple means. The radiation-emitting elements are, for example, LEDs, and the system of radiation emitting elements is, for example, a one-dimensional LED array.

In the device according to the invention, the image to be recorded (written or diagrammatic document) is not scanned in its entirety all at once, but exposed one point after the other and scanned successively in its entirety. Partial exposure is possible of one or more sections. If several areas are partially exposed at the same time, they must be far enough apart for the signals reflected from the illuminated areas and received by a simple detector array of low resolution, not to interfer with each other. Black/white analysis takes place on the basis of the level of the detector signal, and the positioning information is obtained from the triggering pattern of the optical illumination system.

BRIEF DESCRIPTION OF THE DRAWINGS

The invention will now be described in greater detail, by way of examples, with reference to the drawings, in which.

DESCRIPTION OF THE PREFERRED EMBODIMENTS

Figure 1C:
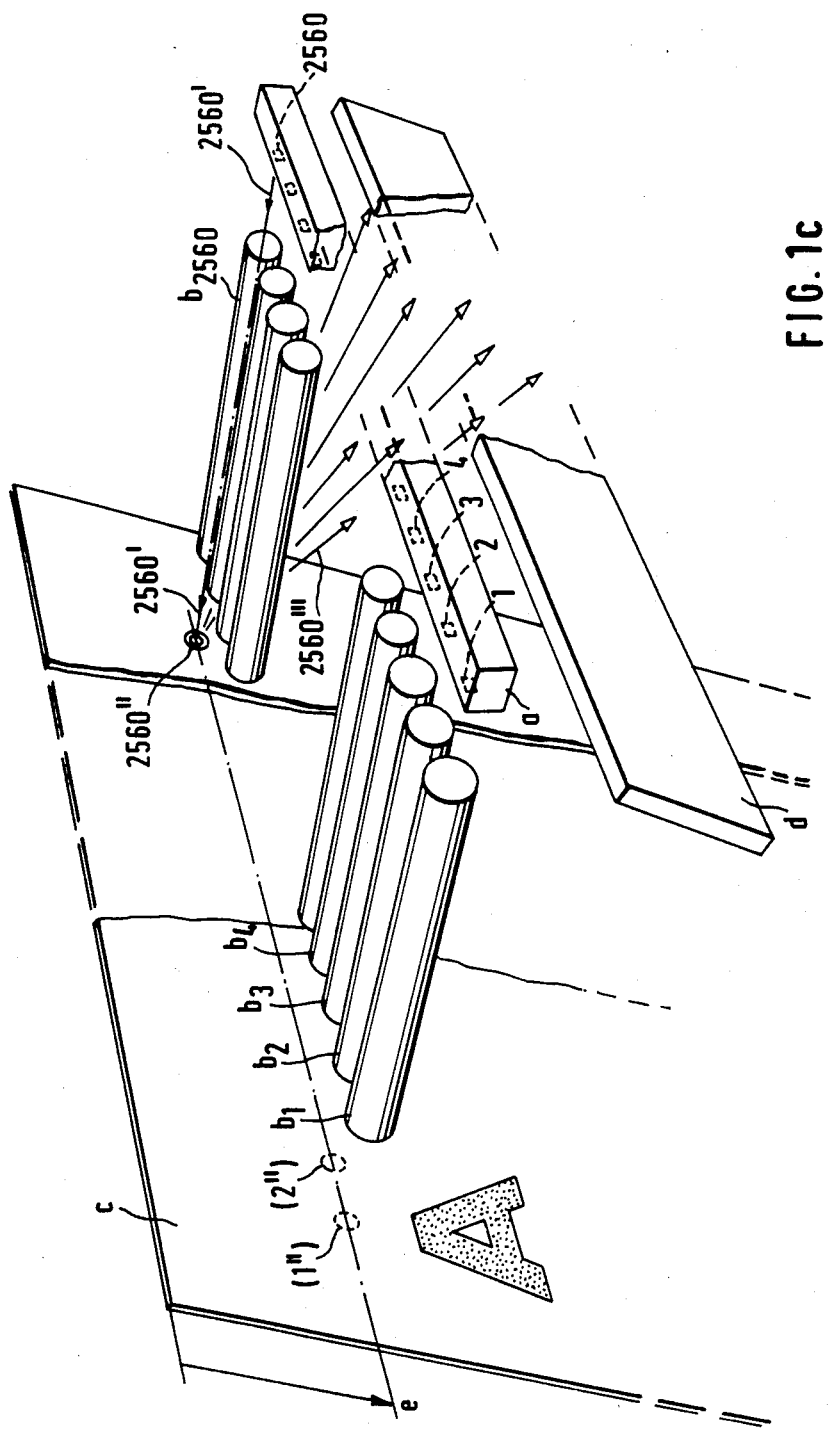
FIG. 1 shows a device for electronic recording of images.

FIGS. 1 (1a to 1c) shows a device for electronic recording of images in accordance with the invention, having an array of LEDs a, a lens system b, and a detector d. An illumination unit as used in electrophotographic printing, for example, can be used as LED array. Such a line of LEDs (a) has, for example, a length corresponding to that of an A4 sheet, and has, for example, 2560 LEDs. The LEDs of the LED line are very close together, so that as many points as possible of the original image to be projected are resolved for high resolution. For example, 12 or 16 LEDs are located on 1 mm length of an LED line, so that the pitch of the LED line is, for example, 1/12 or 1/16 mm.

The original image to be projected consists in the embodiment in FIGS. 1 (1a to 1c) of a sheet of white paper c with the capital letter "A" on it, which is to be recorded electronically using the device according to the invention.

Electronic recording of the original c takes place in accordance with the invention by said original c being illuminated point by point with the aid of LEDs $1 \ldots n$ (n=number of LED lines). In the embodiment in FIG. 1, the LED line has 2560 LEDs. The original c is illuminated point by point by the LEDs of LED line a being triggered one after the other. The embodiment in FIG. 1a shows the first LED 1 of LED line a being triggered while the other LEDs $(2 \ldots n)$ of LED line a in the embodiment of FIG. 1a are not triggered and so do not emit radiation. As a result of the triggering process, LED 1 in the embodiment in FIG. 1a emits a light beam $1'$, which is focussed by a lens system onto the original c at point $1''$. The system b in the embodiment in FIG. 1 may be, e.g., a lens system with a large number of gradient index single lenses $(b_1 \ldots b_m)$. The light beam $1'$ hitting point $1''$ is diffusely reflected in point $1''$. The intensity of the reflected light $1'''$ corresponds to the degree of reflection of the image point $1''$. The light reflected by the original c correspond in their amplitude information corresponding to the black/white conditions at the reflection point in question. If the original at one reflection point is white, the light reflected from said point is more intense than that reflected from a point on the original which is black. It is therefore possible to obtain black/white information from the intensity of the reflected light corresponding to the black/white conditions of the original. Part of the reflected light, corresponding to the solid angle filled by detector d in relation to image point $1''$, picked up by detector d and converted into electrical signals. A detector comprises, for example, a pin diode.

The detector signal is, e.g. by use of a comparator, converted into a digital signal, for example in the form of a 1-bit resolution (black/white). The digital signals received can be stored or used immediately for image reproduction. The information on the position is determined from the pattern of the optical exposure system, which, in the instance of FIG. 1, is an LED array. Since in the embodiment in FIG. 1 the LEDs are triggered one after the other, the triggering pattern, which is also used for reproduction, is particularly simple in this case.

FIG. 1b differs from FIG. 1a in that the second LED 2 is driven instead of the first LED 1, so that only the second LED emits radiation $2'$. In FIG. 1c, all LEDs in the LED array a except the last one have already been turned on, triggered, so that in the embodiment in FIG. 1c the last LED $a_{2560}$ supplies a light signal.

Figure 2:
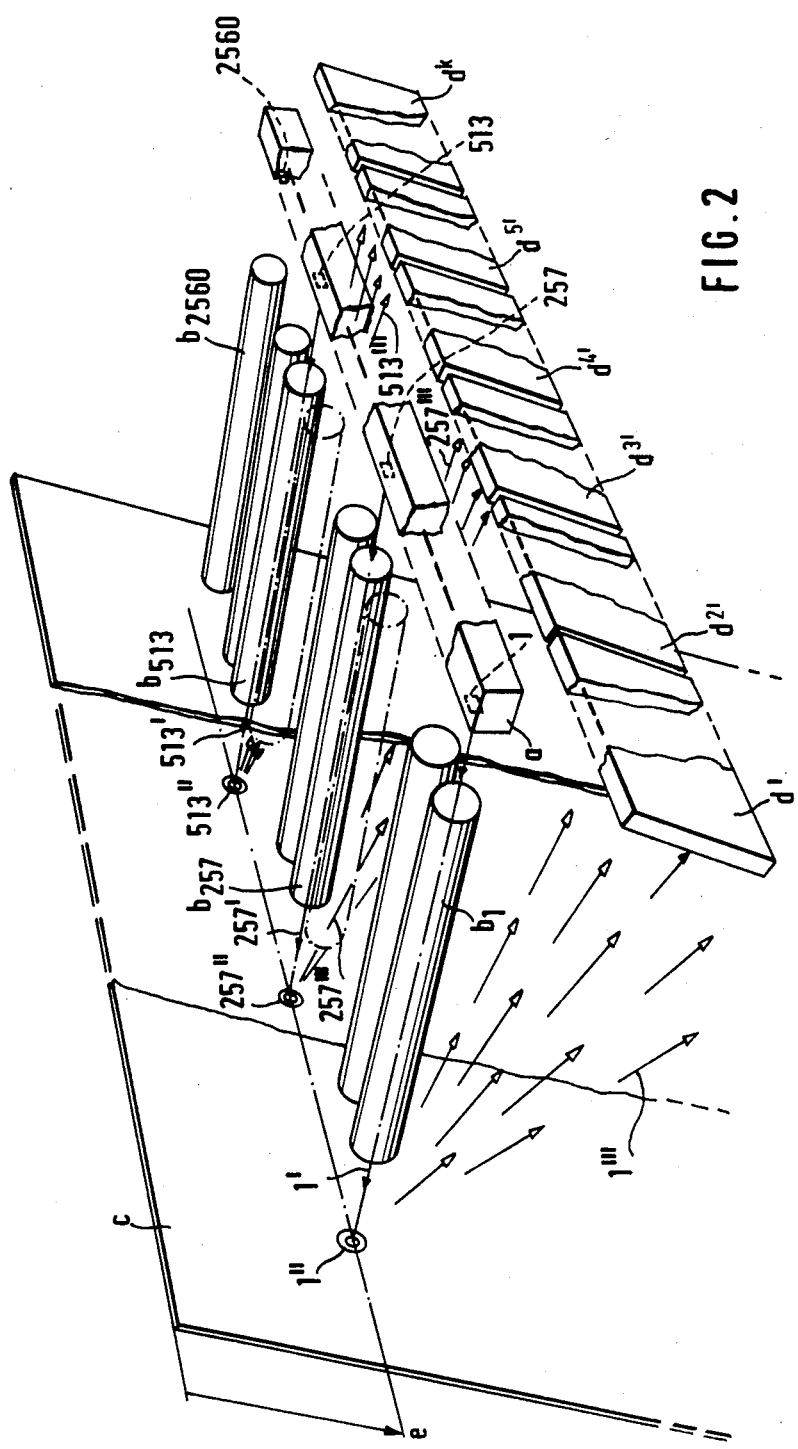
FIG. 2 shows a device with LEDs and detectors.

In practice, several (d', d'', d''', ...) detectors will be used, corresponding to the device shown in FIG. 2, in which, of course, drawing allowed only a few detectors to be shown. This embodiment with several detectors has the additional advantage that several LEDs appropriately spaced (for example 256 LED spacing) can be turned on at once. If an LED array with 2560 LEDs is used, 10 image points can be analysed simultaneously.

Figure 3:
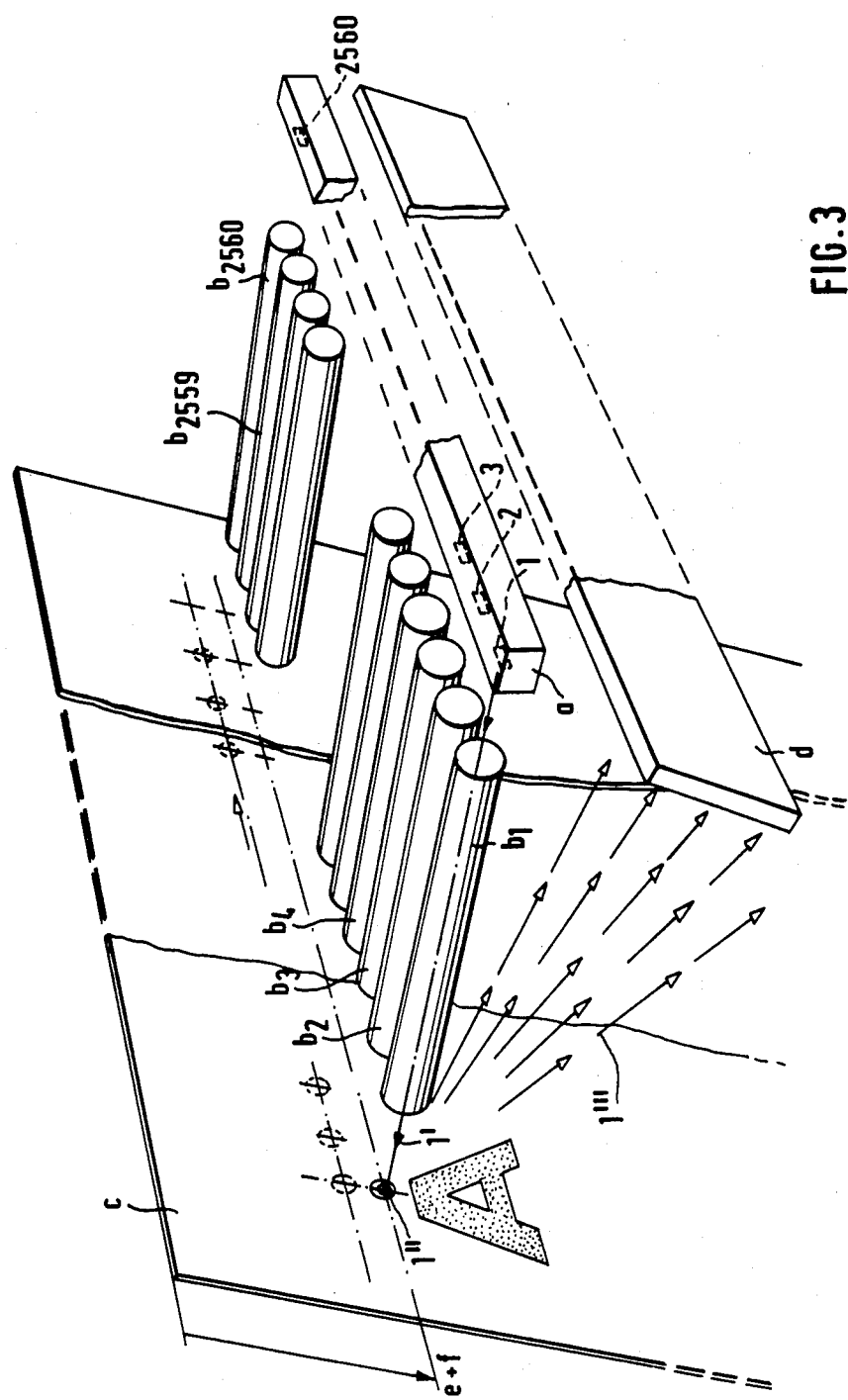
FIG. 3 shows a shift of the original.

If by sequential scanning of the LEDs in the LED array the last —and nth —LED $a_{2560}$ has been reached, the original c is moved until the LED array sequentially exposes the next line of the original according to FIG. 3. The original c is moved according to the required resolution (partial step f). The appropriate advance motion therefore preferably corresponds to the spacing of the LEDs. Movement is performed from bottom to top if the original is to be scanned from top to bottom or vice versa.

Figure 4:
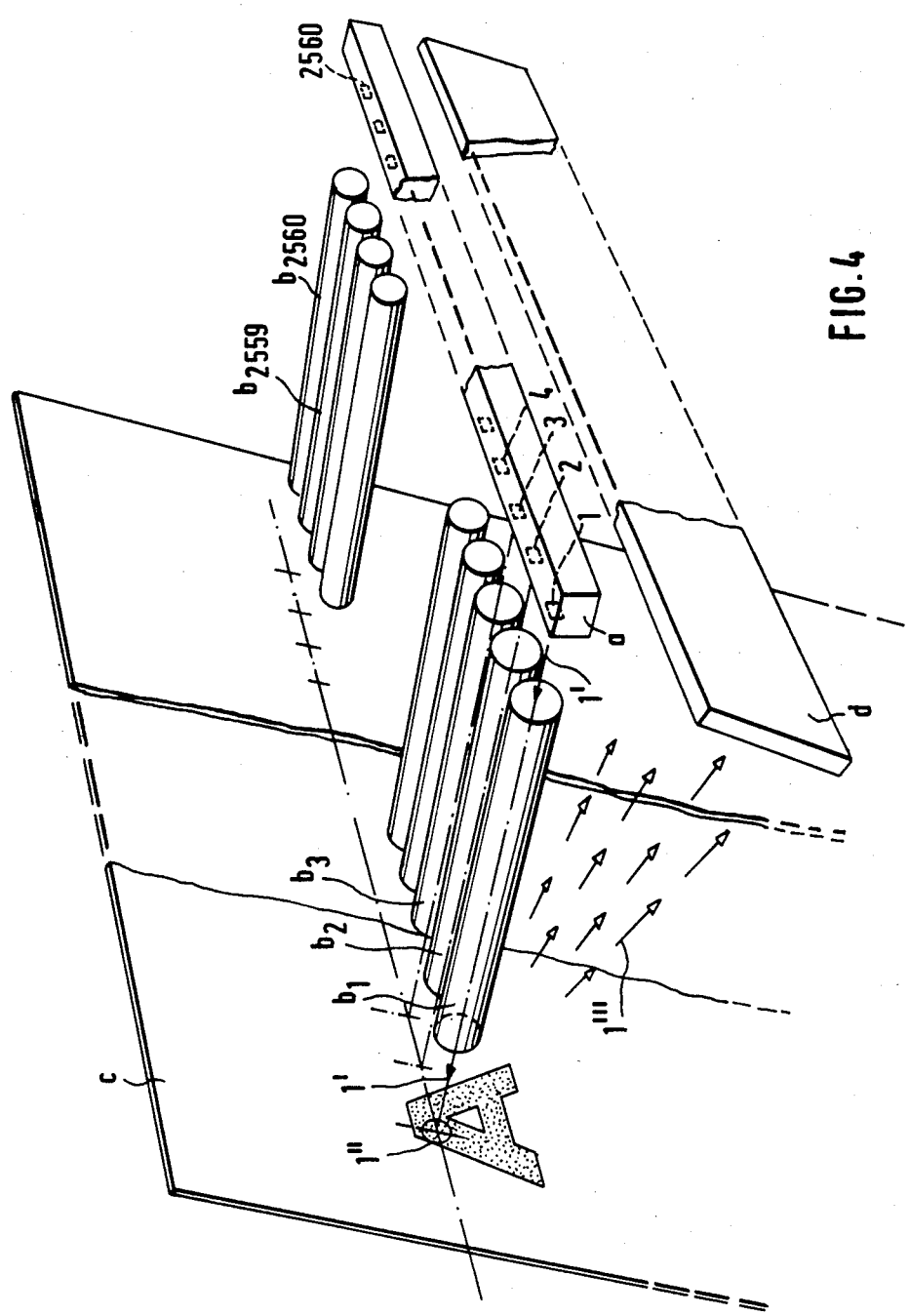
FIG. 4 shows a further shift of the original.

FIG. 4 shows the case where a large number of advance motions have been completed and the letter "A" has been reached with light point $1''$.

Figure 5:
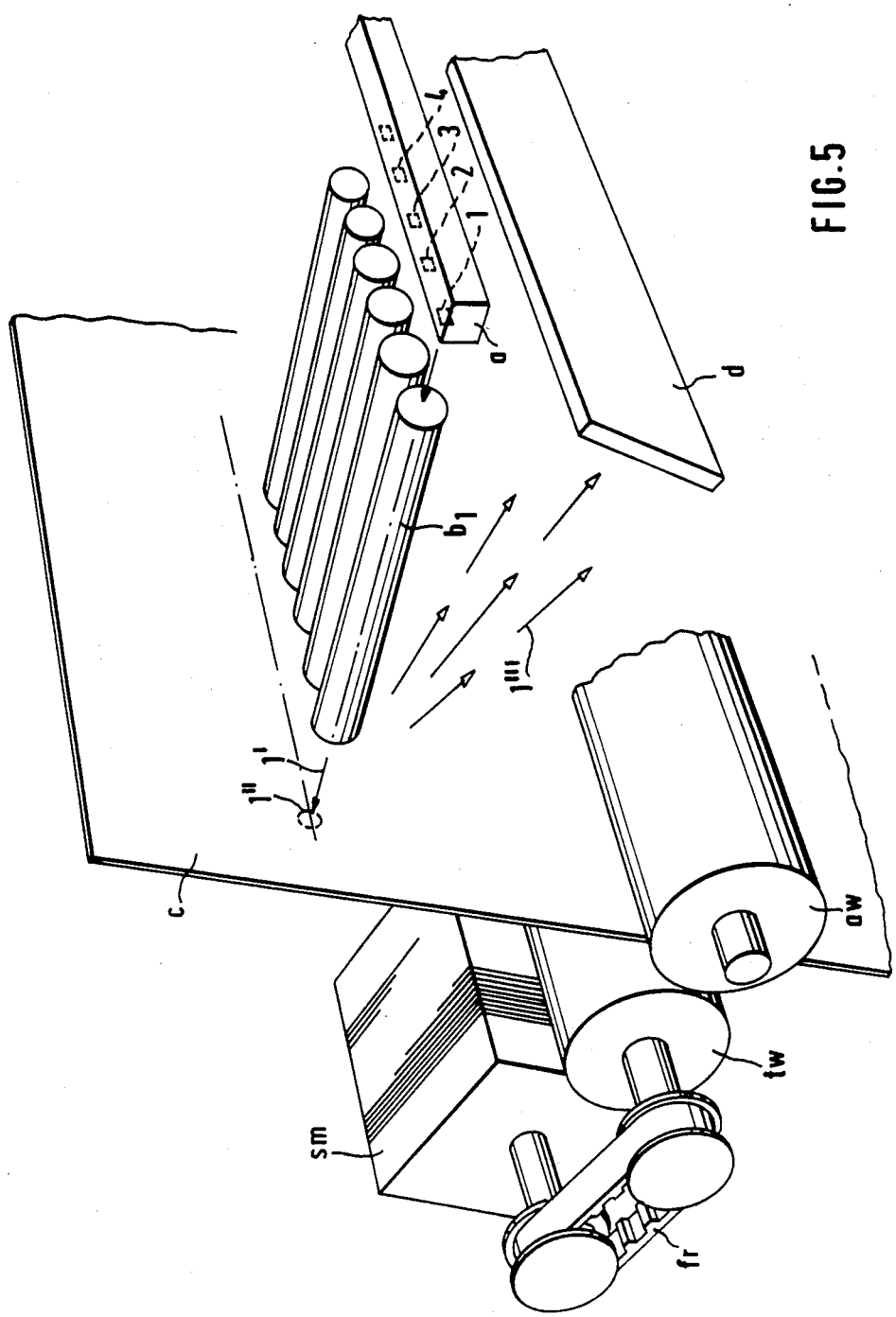
FIG. 5 shows the advance unit for shifting the original.

FIG. 5 shows the paper movement unit. The unit comprises, for example in FIG. 5, a step motor sm, a transport roller tw, and a pressure roller aw. The transport roller tw is driven via a toothed belt fr.

Figure 6:
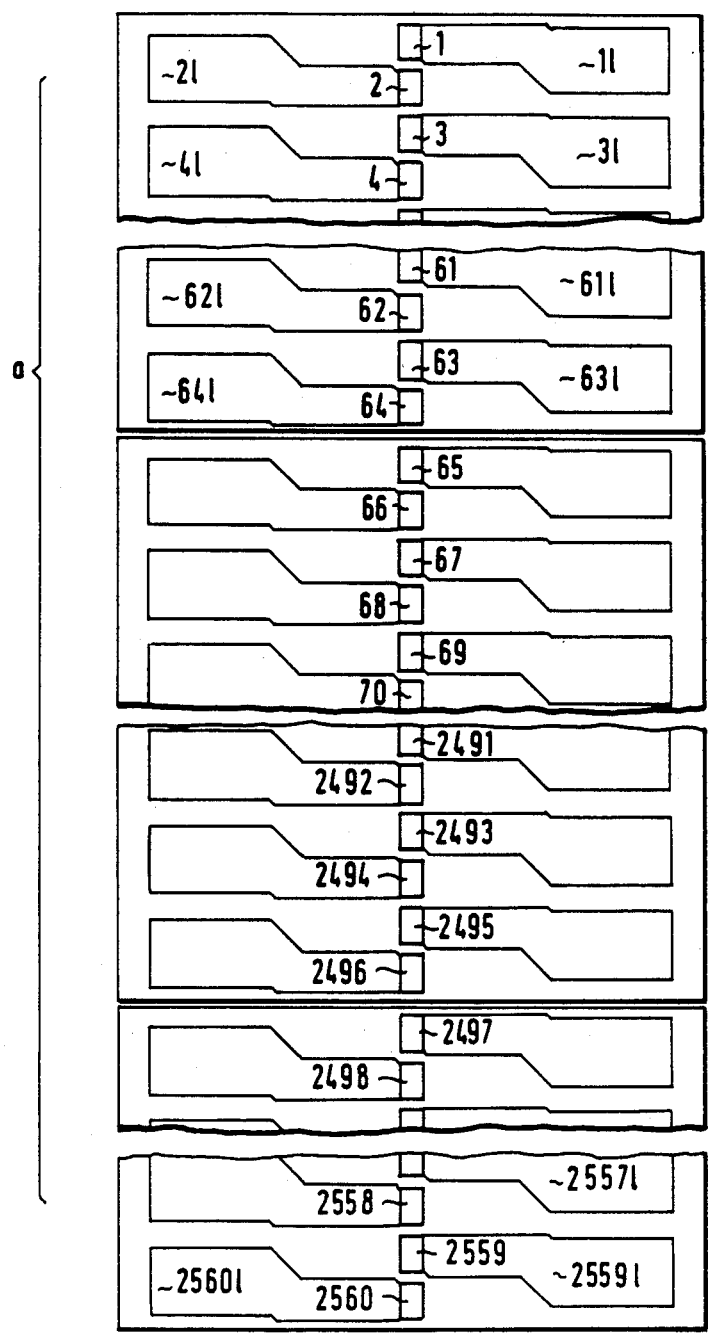
FIG. 6 shows an LED line.

FIG. 6 shows an LED array a with 2560 LEDs. The LEDs (1 ... 2560), made by planar process technology are each contacted by a conductive strip (11 ... 25601). The entire array a comprises several semiconductor chips, each of which has, for example, 64 LEDs.

Figure 7:
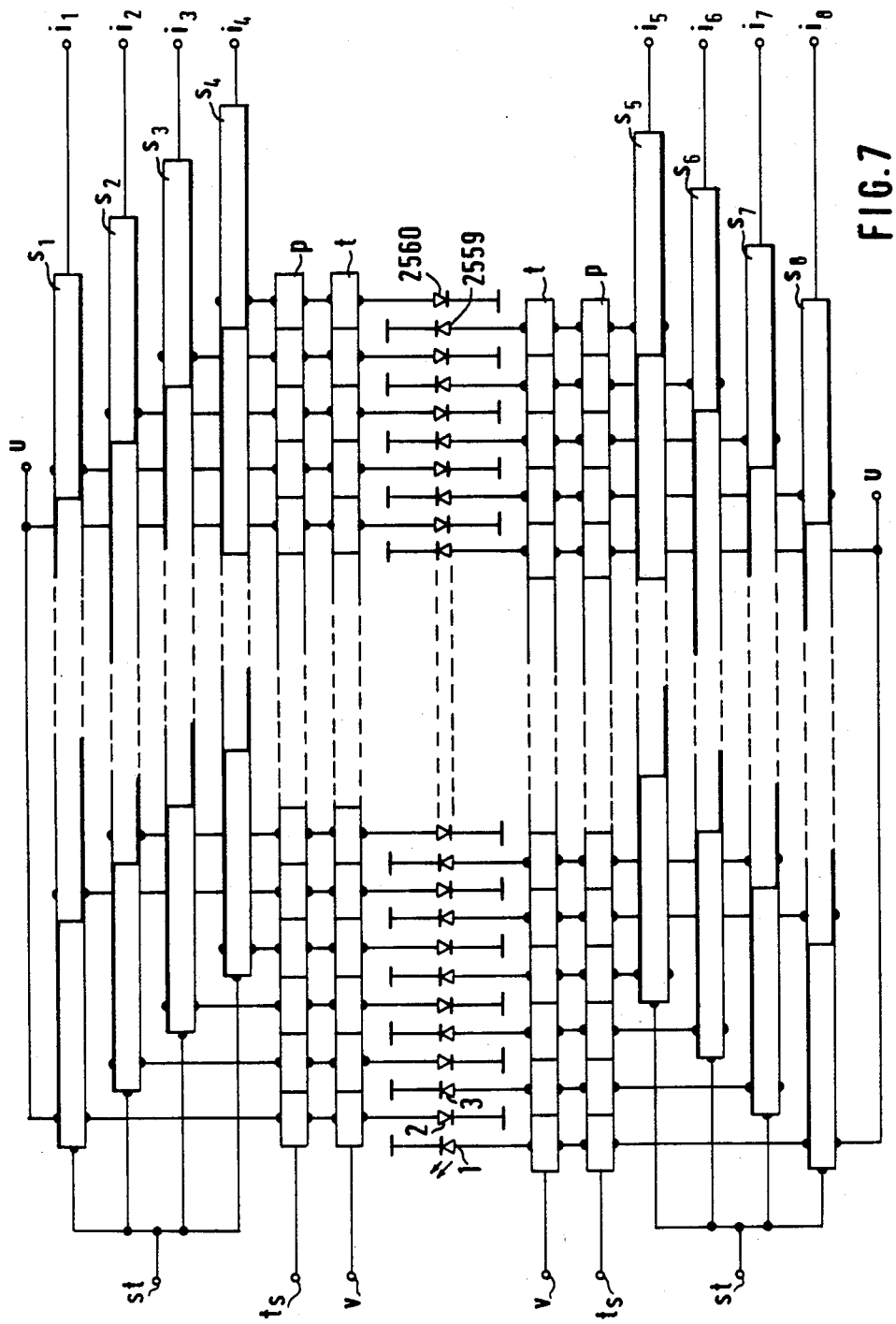
FIG. 7 shows triggering of an LED line.

An embodiment for computerized control of an LED array is shown in FIG. 7. The bit pattern, in accordance with which the LED line is to light up, is loaded via of 8 data inputs $i_1 ... i_8$ into 8 parallel shift registers ($s_1 ... s_8$). This loading procedure is controlled by a control signal st, sent to all shift registers simultaneously. If the contents of the shift register correspond to the desired bit pattern, said contents of the shift register are transferred to latches p by a control signal st. The activation signal v switches on the driver stages t, which then operate the appropriate LEDs in accordance with the bit pattern stored in the latches.

What is claimed is:

1. A device for electronic recording of images with an optical, radiation-emitting exposure device and a detector system for detecting the image information recieved, wherein a sequentially triggered system of radiation-emitting elements is provided for exposure and the image to be recorded is optically scanned using the sequentially triggered radiation-emitting elements, wherein several radiation emitting elements are triggered at once during sequential triggering of the radiation-emitting elements, but with only those elements being triggered simultaneously that are far enough apart for the reflected beams not to interfere.

2. A device according to claim 1, wherein the system of radiation-emitting elements is a linear array of radiation-emitting elements triggered by a logic circuit.

3. A device according to claim 1, wherein the radiation-emitting elements are LEDs.

4. A device according to claim 1, wherein the system of radiation-emitting elements is an LED array.

5. A device according to claim 1, wherein an advance unit is provided that moves the original when all LEDs in the LED array have been triggered.

* * * * *